Oct. 28, 1969     R. G. BABSON ET AL     3,474,680
AIRCRAFT TURBULENCE INDICATOR

Filed June 24, 1966     2 Sheets-Sheet 1

INVENTORS.
ROBERT G. BABSON
& VIRGIL C. JAMES
BY

AGENT

Oct. 28, 1969  R. G. BABSON ET AL  3,474,680
AIRCRAFT TURBULENCE INDICATOR

Filed June 24, 1966  2 Sheets-Sheet 2

INVENTORS.
ROBERT G. BABSON
BY & VIRGIL C. JAMES

W. H. Maxwell
AGENT

United States Patent Office 3,474,680
Patented Oct. 28, 1969

3,474,680
AIRCRAFT TURBULENCE INDICATOR
Robert G. Babson, 16636 Pequeno Place, Pacific
Palisades, Calif. 90272, and Virgil C. James,
22239 Ave. San Luis, Woodland Hills, Calif.
91364
Filed June 24, 1966, Ser. No. 560,303
Int. Cl. G01p 15/08
U.S. Cl. 73—517                           2 Claims

ABSTRACT OF THE DISCLOSURE

This invention provides a direct reading instrument in the form of a turbulence indicator for aircraft or the like and which exhibits the rate of change in acceleration in the vehicle as a result of displacement along an axis disposed in the direction that such a displacement is to be measurably indicated. More particularly, this invention provides a self-contained instrument for the direct and immediate determination of turbulence affecting aircraft in flight. There are several axes of determination and each involves a magnetic mass that is supported substantially frictionless within a winding so that its rate of change in acceleration is comparatively the same as that of the phenomenon known as aircraft turbulence; there being an electrical circuit from the winding to a voltmeter which displays the amplitude and time factors to be detected and observed.

---

Figure 1:
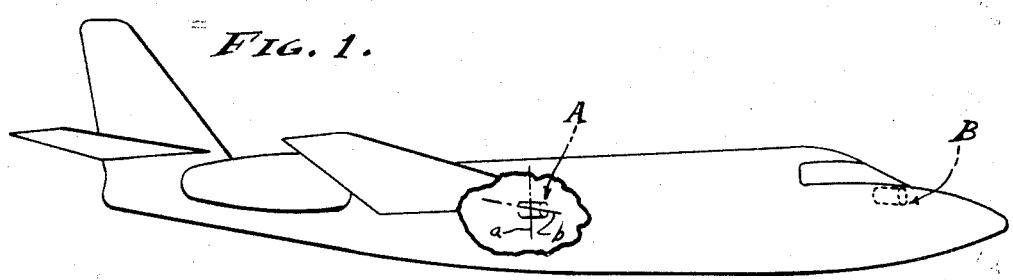

The rapid and constant advance in the performance capabilities of aircraft has forced the development of new concepts in atmospheric behavior. Jet aircraft, currently travel near the speed of sound at altitudes above 25,000 feet and this section of the atmosphere contains high velocity wind streams (jet streams) with wind speeds frequently exceeding 100 knots and occasionally reaching above 200 knots. Variations in direction and velocity of these winds in both the horizontal and the vertical planes, create wind shears and the phenomenon known as clear air turbulence. There is a need, therefore, for a turbulence indicating device that can be used in arriving at a turbulence forecast and which would enable flight crews to avoid or to minimize the discomforts and hazards which turbulent conditions impose.

Turbulence is presently divided into three categories; convective, orographic, and that associated with wind systems. The latter is referred to as clear air turbulence and being rather elusive and unpredictable is of primary concern herein. Its presence introduces the desirability of an airborne device useful in providing an immediate indication of existing turbulence in the clear air and also of the other convection and orographic turbulence when and if encountered.

Generally, a pilot judges turbulent air by its effect on aircraft and in any given turbulent condition the response of the same aircraft, or the response of one aircraft compared with another may be quite different. The pilot must differentiate between gusts which produce bumpiness without appreciable change in flight level and drafts which displace the aircraft a large vertical distance without bumpiness. Drafts are associated with large eddies and gusts with smaller eddies and the response to a certain eddy size depends largely upon the size of the aircraft. There are no distinct boundaries between drafts and gusts, and heretofore there have been but the following guides for the pilot to aid him in determining turbulence intensities:

"Light Turbulence" is the condition during which occupants may be required to use seat belts, but objects in the aircraft remain at rest.

"Moderate Turbulence" is the condition in which occupants require seat belts and are occasionally thrown against the belt and unsecured objects in the aircraft move about.

"Severe Turbulence" is the condition in which the aircraft momentarily may be out of control and the occupants are thrown violently against the belt and back into the seats and the objects not secured in the aircraft are tossed about.

"Extreme Turbulence" is the rarely encountered condition in which the aircraft is violently tossed about and is practically impossible to control.

In other words, turbulence is quite subjective and the pilot is influenced only by air speed and the motion of objects within the aircraft, and also by the frequency and duration of the turbulent jolts. Therefore, aeronautics classifies turbulence intensities by use of the term "gust velocity," which is computed primarily from the acceleration of an aircraft in a given turbulent condition.

It is an object of this invention to accurately and immediately indicate the rate of change of turbulence so that its intensity is objectively known and thereby eliminating the subjective approach thereto, and particularly as related to clear air turbulence. Usefulness of this invention in avoiding clear air turbulence will be apparent, it being apparent that convection and orographic turbulence can be anticipated by observations whereas said clear air turbulence cannot be so detected and ordinarily cannot be anticipated. In this respect, an instrument which immediately detects existing turbulence can be utilized by pilots in reporting the same and the reports of various pilots correlated, all to the end that systems of existing turbulence become immediately known and whereby they can be avoided or compensated for.

It is also an object of this invention to provide a mechanical rule of action which is directly proportional to the rates involved in turbulence applied to structural bodies. With this invention the instrument utilizes the principle that electromotive force is directly proportional to the rate of relative motion of the magnetic field and coil, and this principle is compatible with and relates to the phenomenon being measured.

It is another object of this invention to provide an instrument for the purposes hereinabove referred to and that is self-sufficient and adapted to be accurately calibrated as circumstances require. With the instrument to be described the various rates of change of acceleration are sensed and transmitted to a readout and received thereby for the useful purpose of objective perception. The means of perception can vary widely and is shown hereinafter as a visual indicator in the form of a meter reading. It is to be understood that the instrumentation can utilize the signal transmitted for the automatic operation of other equipment and for the operation of a data recorder, etc.

The various objects and features of this invention will be fully understood from the following detailed description of the typical preferred forms and applications thereof, throughout which description reference is made to the accompanying drawings, in which:

FIG. 1 is a perspective profile of a typical aircraft and the installation therein of the turbulence indicator.

Figure 2:
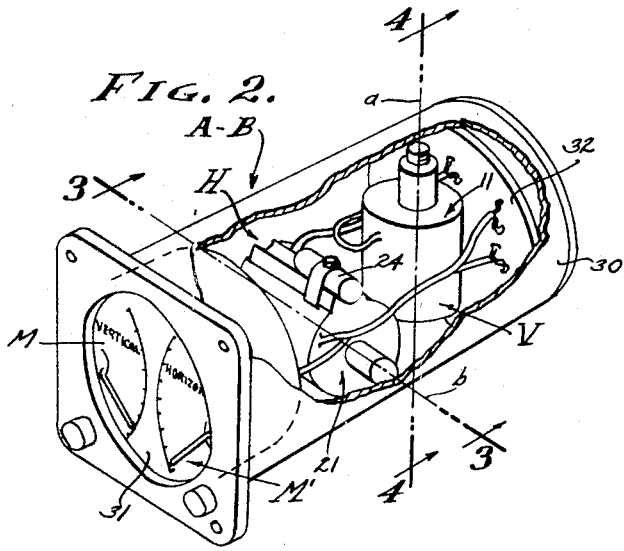
Figure 4:
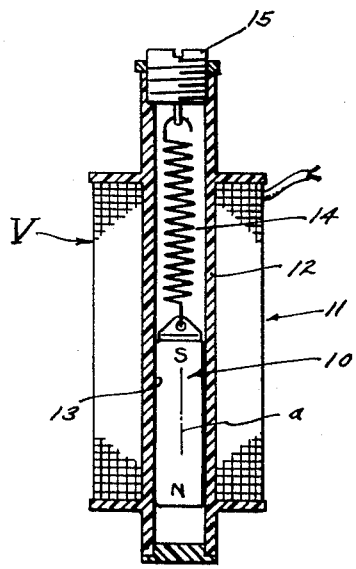
Figure 3:
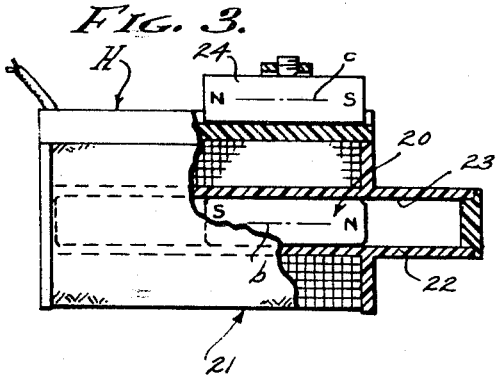
Figure 5:
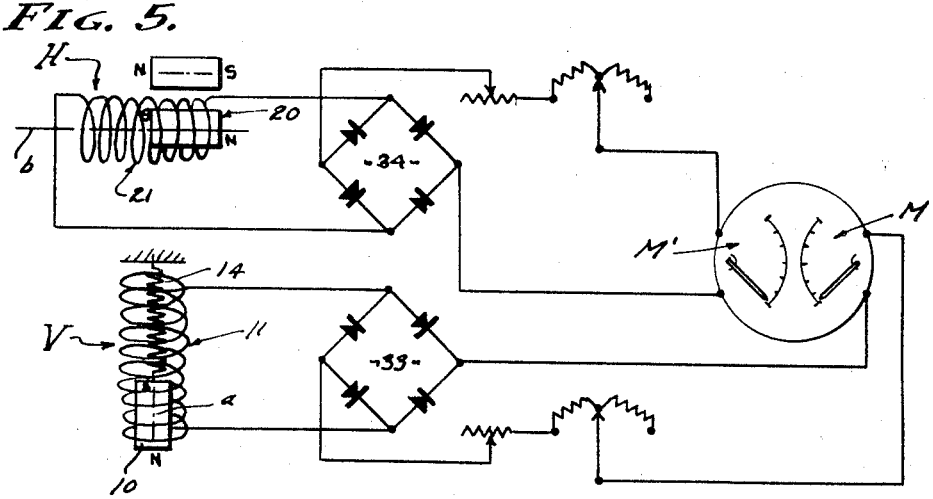

FIG. 2 is an enlarged perspective view showing a typical embodiment of a self-contained turbulence indicating instrument. FIGS. 3 and 4 are sectional views taken substantially as indicated by lines 3—3 and 4—4 on FIG. 2, and FIG. 5 is a diagram showing the basic electrical circuitry that is involved.

Figure 6:
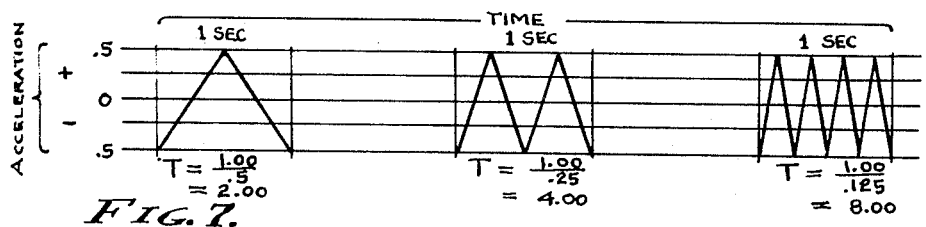
Figure 7:
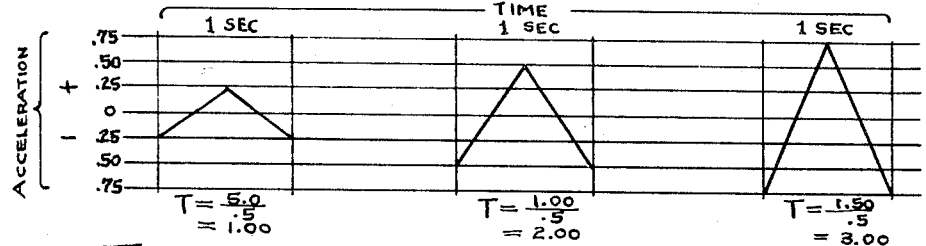
Figure 8:
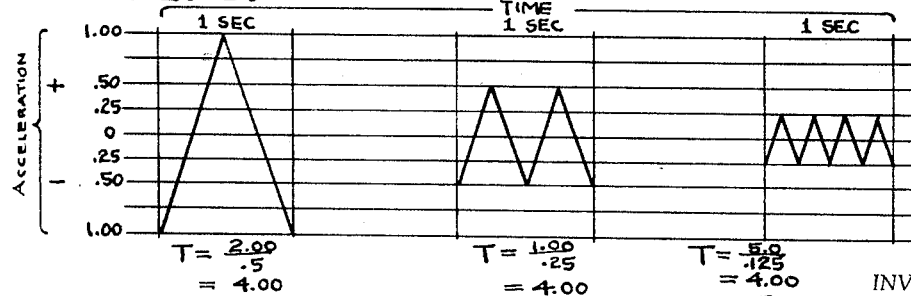

The present invention has as one of its most useful applications an embodiment of a turbulence indicator, it being understood that the instrument herein disclosed has other analogous uses in vehicles and the like other than aircraft. In FIG. 1 of the drawings we have shown the profile of a typical aircraft and the instrument of the present invention installed therein, the sensor and/or transmitter A being installed at the center of gravity and the received B being installed at the pilot's console. In FIG. 2 of the drawings we have shown a typical embodiment of the instrument wherein the sensor and/or transmitter A and the receiver B are combined into one unit for installation at the pilot's console. In either instance the receiver B is visibly presented to the pilot for his immediate perception, and as shown in FIG. 1 it is feasible to separate elements A and B for detection of inertial displacements at or near the center of gravity. Further, the axis of displacement can vary, it being of importance to know of forces applied both vertically and horizontally in a transverse plane, and also to know of forces applied longitudinally. However, the latter is the least significant since aircraft are most efficiently streamlined along the longitudinal axis. Therefore, it is the vertical axis $a$ and horizontal axis $b$ which are of primary importance and which are considered necessary to be known, and from these two factors the lateral displacements as caused by gusts can be determined. To this end the sensor and/or transmitter A involves one or more force generators and each of which is responsive to movement and thereby generates a forceful signal proportional to said movement. In accordance with the invention it is the variation of acceleration which is advantageously employed in an inertial body which oscillates to opposite maximum and minimum positions relative to the supporting vehicular body. In practice, the moveable mass of the instrument is an element of an electrical generator, either the armature or the field and preferably the field in the form of a permanent magnet yieldingly supported and/or centered by a spring means. The said spring means can vary, two such means being illustrated in the preferred form of the invention shown herein. There is a vertically moveable mass 10 that is suspended by a coil spring, and there is a horizontally moveable mass 20 that is suspended magnetically. The mass 10 is operable within an armature 11 while the mass 20 is operable within an armature 21, the elements 10 and 11 forming a vertical force generator V, the elements 20 and 21 forming a horizontal force generator H. As shown, the generator V is disposed so that the mass of the moveable field 10 shifts inertially along the axis $a$ while the generator H is disposed so that the mass of the moveable field 20 shifts inertially along the axis $b$. The forced generators V and H are essentially alike and provide an accurate means for generating an electromotive force wherein aircraft turbulence is indicated under all flight conditions. To this end the formula $T = \Delta A / \Delta t$ has been devised; wherein T is turbulence; wherein $\Delta A$ is the variation of acceleration or the difference between the minimum and the maximum acceleration, and in the instrument herein disclosed is the physical displacement relative to the aircraft of a mass on excursions between spaced extremes; and wherein $\Delta t$ is the time interval between minimum and maximum accelerations or the time which it takes said mass to execute its excursions between said negative and positive extremes. The resultant of this formula is the rate of change in acceleration which is the same as the phenomenon known as aircraft turbulence, and like phenomenon; and the basis for this relationship is graphically illustrated in FIGS. 6, 7 and 8. The trace lines in these graphs represent those of, for example, an accelerometer when activating a recorder. FIG. 6 shows three representative degrees of inflight turbulence which can be termed light, moderate and severe for the purpose of this disclosure. In each representation $\Delta A$ is the same while $\Delta t$ varies, and as a resultant we have an example of three degrees of rate of change of acceleration, and wherein the slope of the trace lines increase with the increase of turbulence. FIG. 7 shows three representations wherein $t$ is the same while $\Delta A$ varies, and as a resultant we again have an example of three degrees of rate of change of acceleration, and wherein the slope of the trace lines increase with the increase of turbulence. FIG. 8 shows three representations wherein both $\Delta A$ and $\Delta t$ vary without change in rate of change of acceleration, showing thereby that the rate of change in acceleration can remain the same if $\Delta A$ varies decreases by the same rate that $\Delta t$ decreases. It is significant then that in FIG. 8 the slope of the trace lines remain the same in each of the three instances.

The electrical basis to substantiate the foregoing is that $$E = -N \frac{\Delta \phi}{\Delta t} 10^{-8}$$

wherein N is the number of loops in the armature winding; wherein $\Delta \phi$ is the change in flux (in lines or Maxwells); wherein $\Delta t$ is the time interval; and wherein $10^{-8}$ is Webers per second; N and $10^{-8}$ being constant for a given instrument. Since the magnetic field of a good quality permanent magnet is substantially constant a change of flux within the armature winding is caused by the rate of relative motion between the magnet and the armature. Therefore, the voltage induced is proportional to the change in flux divided by the time interval $t$. A direct reading of aircraft turbulence is then read on a voltmeter M and M' by assigning turbulence values to the variations in voltages generated.

The vertical force generator V is operable to detect vehicular displacements along the axis $a$ and involves the permanent magnet mass 10 that is reciprocably operable within the multiple turn winding of the armature 11. The winding of armature 11 surrounds a cylindrical form 12 that has a bore 13 to receive the magnet mass 10. The mass 10 is a cylindrical solid that is slideable in the bore 13 the form 12 being of an anti-friction type of material such as Teflon. In this first described force generator the mass 10 is supported by a mechanical spring means, a spring coil 14 anchored to a vertically adjustable plug 15 at the upper end of the bore 13 and connected to the top end of the mass 10. In practice, the mass 10 is substantially shorter than the axial extent of the form 12 and surrounding armature winding, with its terminal ends being the opposite magnetic poles, and to the end that flux lines of the magnet cut through the armature winding. The spring coil 14 is immersed to operate within the armature winding, so that the field of the magnet extends through the winding to generate voltage when relative movement occurs. It will be apparent that the mass 10 will oscillate in the armature 11, being supported on a resilient support.

The horizontal force generator H is operable to detect vehicular displacement along the axis $b$ and involves the permanent magnet mass 20 that is reciprocably operable within the multiple turn winding of the armature 21. The winding of armature 21 surrounds a cylindrical form 22 that has a bore 23 to receive the magnet mass 20. The mass 20 is a cylindrical solid that is slideable in the bore 23, the form 22 being of anti-friction type material such as Teflon. In this second described form of generator the mass 20 is supported by a magnetic spring means, approximately positioned magnet 24 placed exteriorly of the generator to position and also to oppositely bias the mass 20. In practice, the mass 20 is substantially shorter than the axial extent of the frame 22 and surrounding armature winding, with its terminal ends being of opposite magnetic poles, and to the end that flux lines of the magnet cut through the armature winding. The magnet 24 is positioned and secured to the frame 22 so that its axis $c$ is offset and parallel to the axis $b$, the opposite poles of the two magnets being opposed so as to attract each other, as shown. Accordingly, the axis is disposed in a vertical plane coincidental with the axis $b$, and the distance between axis $b$ and axis $c$ adjusted so that the mass 20 floats within bore 23 substantially weightlessly. That is, the mass 20 does not of its weight have bearing in the bore 23 and is only guided therein. The magnet 24 is immersed to operate within armature winding, so that the field of the magnet extends through the winding to generate voltage when relative movement occurs. It will be apparent that the mass 20 will oscillate in the armature 21, being suspended upon a support that centers and biases the same against movement in opposite directions.

From the foregoing it will be seen that each generator produces alternating current when its mass oscillates in its armature as a result of bodily displacements of the vehicle. The instrument can be unitized by containing the generators V and H within a shell 30, and with the readout on the face 31 of the instrument as part of the pilots console. In this case, the readouts are a voltmeter M for vertical turbulence and a voltmeter M' for horizontal turbulence and in which case we provide a circuit board 32 with rectifier circuits 33 and 34 for suitable operation of the meters M and M' respectively. As is indicated, the two circuits can be calibrated and as well they can be sensitized as circumstances require, all by means of adjustable resistors and manually positionable controls.

Having described only a typical preferred form and application of our invention, we do not wish to be limited or restricted to the specific details herein set forth, but wish to reserve to ourselves any modifications or variations that may appear to those skilled in the art.

Having described our invention, we claim:

1. A direct reading self-contained instrument for detecting the amplitude and time duration of turbulence affecting aircraft in movement along the longitudinal axis of flight and including, a magnet mass slideably guided by antifriction means fixed in the aircraft and along a movement axis disposed horizontally with respect to the aircraft and transversely of said longitudinal axis and surrounded by an armature winding, said axis of movement being disposed in the direction that turbulence is to be detected, means initially positioning the magnet mass operatively within the armature winding and comprising a magnet fixedly positioned over the magnet mass and with its north pole attractively cooperating with the south pole of said magnet mass and with its south pole attractively cooperating with the north pole of said magnet mass for substantially weightless engagement of said magnet mass with said antifriction means, and a voltmeter displayed for observation and in an electrical circuit through said armature winding and responsive to changes in voltage caused by movements of the said magnet mass when the aircraft is displaced along said horizontally transverse axis.

2. A direct reading self-contained instrument for detecting the amplitude and time duration of turbulence on distinct axes affecting aircraft in movements along the longitudinal axis of flight, and including, an instrument housing, a first magnet mass slideably guided by antifriction means fixed in the housing and along a movement axis disposed vertically with respect to the aircraft and normal to said longitudinal axis and surrounded by an armature winding and with spring means initially positioning the first magnet mass operatively within the armature winding, a second magnet mass slideably guided by antifriction means fixed in the housing and along a movement axis disposed horizontally with respect to the aircraft and transversely of said longitudinal axis and surrounded by an armature winding and with means initially positioning the second magnet mass operatively within the armature winding and comprising a magnet fixedly positioned over the second magnet mass and with its north pole attractively cooperating with the south pole of said second magnet mass and with its south pole attractively cooperating with the north pole of said second magnet mass for substantially weightless engagement of said second magnet mass with said antifriction means, and a pair of voltmeters displayed at a face on the housing and each in an electrical circuit to one of said armature windings and responsive to changes in voltage caused by movements of the respective first and second magnet masses therein when the aircraft is displaced along said vertical and horizontal transverse axes respectively.

References Cited

UNITED STATES PATENTS

| 2,469,137 | 5/1949 | Strong | 73—71.2 |
| 2,756,406 | 7/1956 | Schurman | 310—15 |
| 2,740,946 | 4/1956 | Geneslay | 73—71.2 |
| 2,797,912 | 7/1957 | Trostler | 73—516 |
| 3,129,347 | 4/1964 | Tognola | 73—517 |
| 3,243,238 | 3/1966 | Lyman | 308—10 |
| 3,319,472 | 5/1967 | Reefman | 73—517 |

JAMES J. GILL, Primary Examiner

H. GOLDSTEIN, Assistant Examiner

U.S. Cl. X.R.

73—71.2